United States Patent Office.

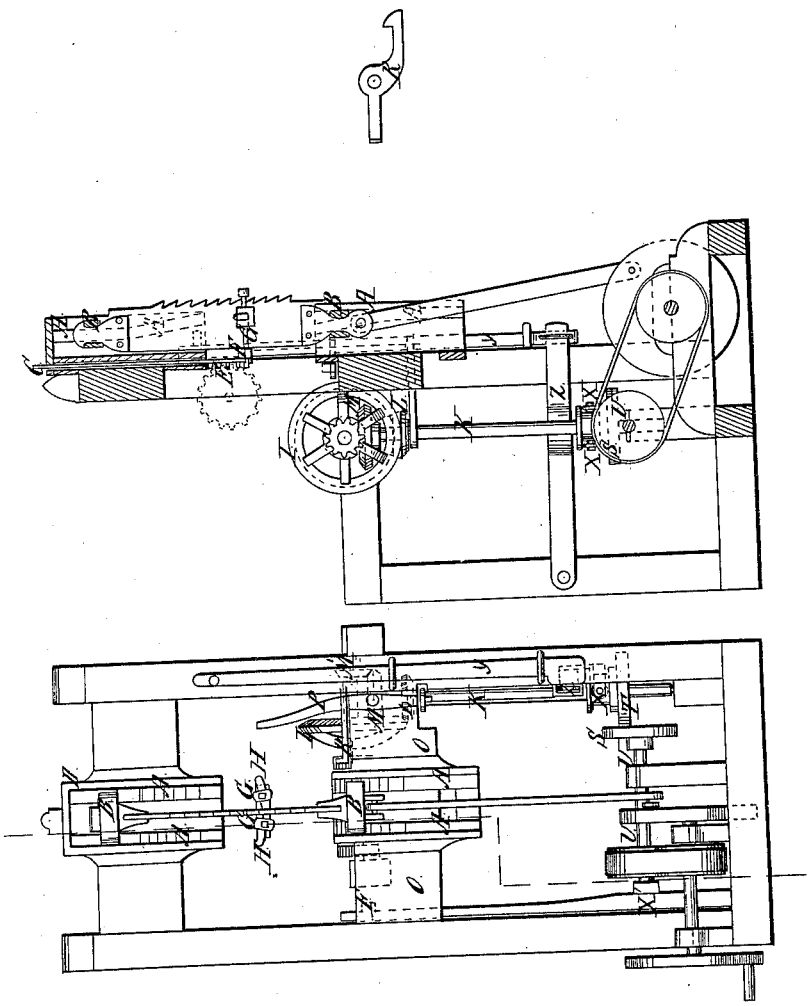

R. F. WOLCOTT, OF CLAREMONT, NEW HAMPSHIRE.

Letters Patent No. 94,683, dated September 7, 1869.

IMPROVEMENT IN MULEY-SAW MILLS.

The Schedule referred to in these Letters Patent and making part of the same.

*To all whom it may concern:*

Be it known that I, R. F. WOLCOTT, of Claremont, in the county of Sullivan, and State of New Hampshire, have invented a new and useful Improvement in Muley-Saw Mills; and I do hereby declare that the following is a full, clear, and exact description thereof, which will enable others skilled in the art to make and use the same, reference being had to the accompanying drawing, forming part of this specification.

This invention relates to improvements in muley-saw mills, and has for its object to provide an improved arrangement of the guides for the cross-heads, to give the saw a peculiar oscillatory movement at the same time that the downward-cutting action takes place.

Also, certain improvements in the adjustable guides for the sides of the saw.

Also, certain improvements in the "gigging"-back and feeding-devices.

Figure 1 represents a front elevation of my improved mill.

Figure 2 represents a sectional elevation of the same, taken on the line $x\,x$ of fig. 1.

My improvements in the guides A, for the saw cross-heads B, consist in so arranging them, that during the first part of the downward-movement of the saw the lower cross-head, and consequently the lower part of the saw, are thrown forward, while the upper cross-head is thrown forward during the last part of the downward-movement, and in the upper movement the top first moves back, and then the bottom, as will be clearly shown by inspection of fig. 2, where the jaws and guides are shown in dotted lines.

This arrangement gives a peculiar oscillatory movement to the cutting-edge of the saw, which distributes the shock occasioned by the striking of the saw into the log at two parts of the saw, and measurely divides the effect into two separate shocks, occurring at different points of time, thereby making the same less straining to the parts.

My improvements in the arrangements of the side-guides for the saw consist (in lieu of the common arrangement of a sliding guide on each side of the upper box) of a single sliding bar, C, arranged in the rear of the box, and provided with a toothed rack, E, to be actuated for adjusting up and down by a pinion and hand-crank.

Upon the lower end of the sliding bar, I provide a cross-head, F, ranging transversely of the saw-frame, and supporting, at each end, adjustable bars G, parallel with the sides of the saw, one on each side thereof, and carrying adjustable guides H, to be adjusted against the sides of the saw and held by set-screws.

For feeding and "gigging" the carriage, I arrange the rag-wheel I, on the feeding-shaft, with a considerable concavity on the side fronting the vertical shaft K, from which it is actuated by a bevel-pinion, L.

The object of this concavity is to make room for a bevel friction-wheel, M, of sufficient diameter to move the carriage back with the proper speed to be placed on the shaft K, above the pinion L, and to work with another bevel friction-wheel, M', on the feed-shaft, opposite to the rag-wheel.

The upper end of the shaft K is borne in one end of a vibrating bar, N, pivoted near the centre, on the under side of the beam O, which supports the lower cross-head box, the other end of the said bar being connected to the shifting-lever P, also pivoted to the said beam, and engaging with a pivoted dog, R, on the top of the said beam, which holds the feeding-pinion L in gear with the said rag-wheel.

Motion is communicated to the shaft K, by friction-wheels S T, from a shaft, U, operated from the crank-shaft.

The face of the wheel T bears against the side of the driving-wheel S, and the former is movable to or from the axis of the latter, to vary the speed.

The effect of the necessary pressure of the wheel T, to produce the required friction, is to spring the shaft K, so that when the shifting-lever P is disengaged from the holding-dog R, the upper end of the shaft K will spring out of gear with the rag-wheel and bear the "gigging"-back wheel M against the friction-wheel M', so that a slight pressure, by the operator, on the lever P, in the same direction, will cause the return-movement of the carriage.

The holding-dog R is designed to be actuated by the contact of a projection on the carriage, to discharge the shifting-lever, for throwing the feed out of gear, in the usual manner.

For actuating the friction-wheel T, to change the feed, I provide anti-friction rollers, X, to work in the groove of the hub of said wheel on the ends of the crotch, and this crotch is actuated by a long slide, Y, and lever, Z.

For adjusting or varying the friction of the wheels S T, I mount the opposite end of the shaft U in a lever-support, $X^1$, free to oscillate on its bottom end, and having an adjusting-screw, $X^2$, at the top, as shown in dotted lines in fig. 1, whereby a slight endwise-movement may be imparted to the said shaft, to or from the wheel T.

Having thus described my invention,
What I claim as new, and desire to secure by Letters Patent, is—

1. The arrangement of the guides A A, as herein shown and described, for the purpose specified.

2. The sliding bar C, provided with the rack E and the cross-head F, supporting the adjustable bars G, carrying the adjustable guides H, all arranged to operate as and for the purpose specified.

3. The concave rag-wheel I, friction-wheels M M', springing-shaft K, and shifting-lever P, all arranged substantially as specified.

R. F. WOLCOTT.

Witnesses:
J. W. JEWETT,
WM. COFFRIN.